(12) United States Patent
Carroll et al.

(10) Patent No.: US 12,088,467 B2
(45) Date of Patent: *Sep. 10, 2024

(54) DETERMINING CONFIGURATION CHANGES IN A CLOUD COMPUTING ENVIRONMENT

(71) Applicant: Capital One Services, LLC, McLean, VA (US)

(72) Inventors: Seth Patrick Carroll, Murphy, TX (US); David Samuel Burkhalter, Jr., Dallas, TX (US); Jay Son, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,188

(22) Filed: Oct. 5, 2023

(65) Prior Publication Data

US 2024/0039789 A1 Feb. 1, 2024

Related U.S. Application Data

(63) Continuation of application No. 17/699,832, filed on Mar. 21, 2022, now Pat. No. 11,824,718.

(51) Int. Cl.
| | |
|---|---|
| *G06F 15/173* | (2006.01) |
| *H04L 41/0853* | (2022.01) |
| *H04L 41/22* | (2022.01) |
| *H04L 67/10* | (2022.01) |

(52) U.S. Cl.
CPC ......... *H04L 41/0853* (2013.01); *H04L 41/22* (2013.01); *H04L 67/10* (2013.01)

(58) Field of Classification Search
CPC .................. H04L 41/0853; H04L 67/10
See application file for complete search history.

(56) References Cited

U.S. PATENT DOCUMENTS

| | | | |
|---|---|---|---|
| 10,693,804 B1 * | 6/2020 | Gladney | G06F 16/903 |
| 10,705,823 B2 | 7/2020 | Pitre et al. | |
| 10,749,886 B1 | 8/2020 | Kandel et al. | |
| 11,012,370 B1 | 5/2021 | Gladney | |
| 11,038,784 B2 | 6/2021 | Nickolov et al. | |
| 2019/0102162 A1 * | 4/2019 | Pitre | H04L 63/102 |
| 2020/0137097 A1 | 4/2020 | Zimmermann et al. | |
| 2020/0356536 A1 | 11/2020 | Nilsson | |
| 2022/0197708 A1 * | 6/2022 | Demazeau | G06F 9/5072 |
| 2023/0300028 A1 | 9/2023 | Carroll et al. | |

* cited by examiner

*Primary Examiner* — Padma Mundur
(74) *Attorney, Agent, or Firm* — Sterne, Kessler, Goldstein & Fox P.L.L.C.

(57) ABSTRACT

A central cloud computing account may aggregate events (e.g., configuration change events, policy change events, computing resource-based events, AWS resource policy modification events, etc.) from a plurality of non-centralized (e.g., distributed across various geographic regions, etc.) cloud computing accounts. The central cloud computing account may implement standardized and/or common formatting for configuration information (e.g., computing resource policy information, AWS resource policy information, etc.) indicated by each of the aggregated events. The standardized and/or common formatting may facilitate versioning to indicate changes to the configuration information for each of the non-centralized cloud computing accounts.

20 Claims, 5 Drawing Sheets

```
policy = {
  "Statement": [
    {
      "Sid": "ListObjectsInBucket",
      "Effect": "Allow",
      "Action": ["simple storage service:ListBucket"],
      "Resource": ["computing resource 122::bucket-name"]
    }
  ]
}
```
200 ─ (policy block)
201 → "Sid": "ListObjectsInBucket"
202 → "Action": ["simple storage service:ListBucket"]
203 → "Resource": ["computing resource 122::bucket-name"]

```
policy = {
  "Statement": [
    {
      "Sid": "ListObjectsInBucket",
      "Resource": ["bucket-name::computing resource 122"],
      "Action": ["simple storage service:ListBucket"],
      "Effect": "Allow"
    }
  ]
}
```
204 ─ (policy block)
205 → "Resource": ["bucket-name::computing resource 122"]
206 → "Action": ["simple storage service:ListBucket"]
207 → "Effect": "Allow"

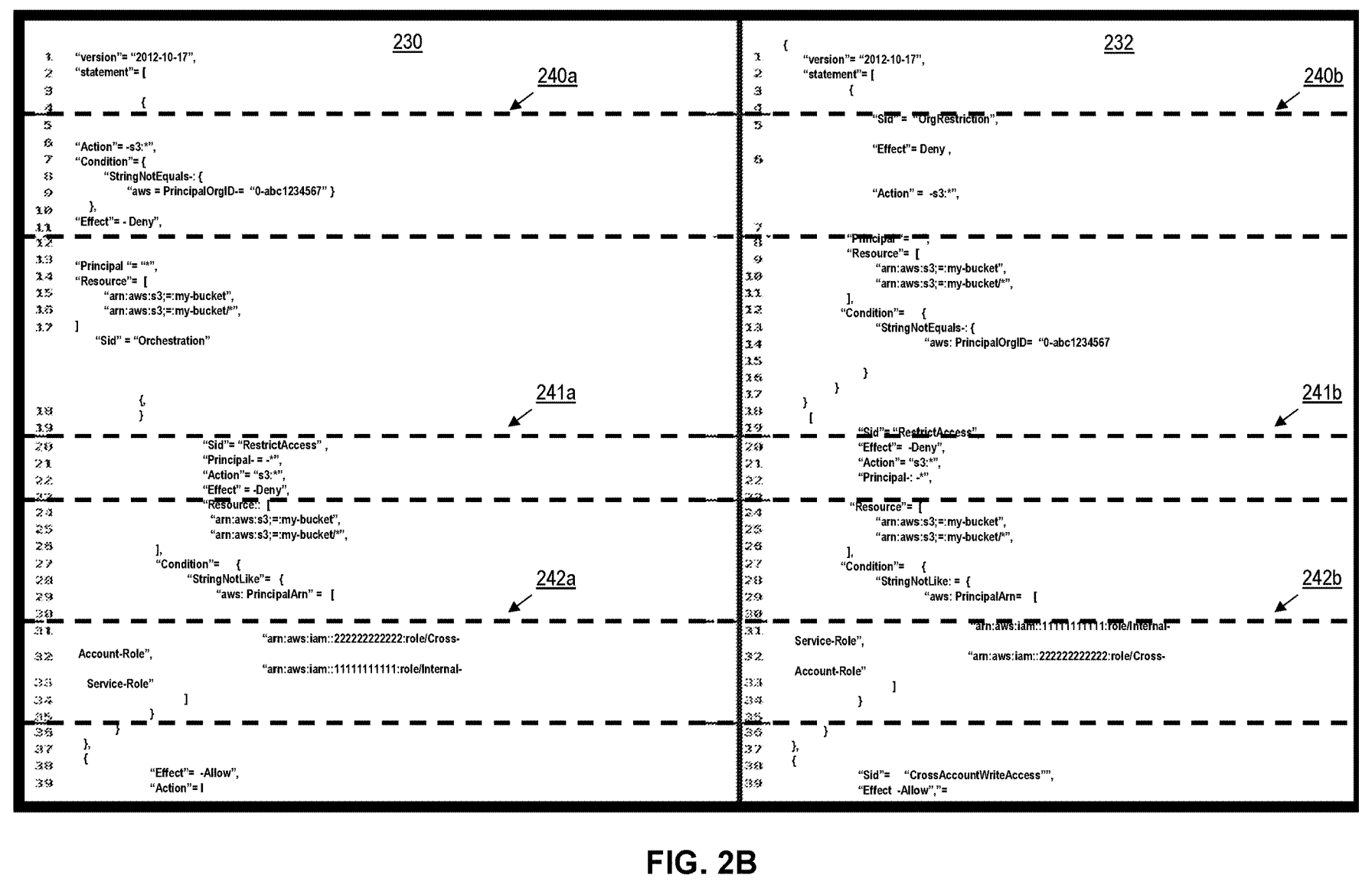

```
1   "version"= "2012-10-17",
2   "statement"= [
3       {
4   ─ ─ ─ ─ ─ ─ ─ ─ ─ ─ ─ ─ ─ ─ ─ ─ ─ ─   240a
5       "Action"= "s3:*",
6       "Condition"= {
7           "StringNotEquals"= {
8               "aws = PrincipalOrgID-= "0-abc1234567" }
9           },
10      "Effect" = -Deny",
11      },
12      "Principal " "*",
13      "Resource"= [
14          "arn:aws:s3;=:my-bucket",
15          "arn:aws:s3;=:my-bucket/*"
16      ],
17      "Sid" = "Orchestration"
18  ─ ─ ─ ─ ─ ─ ─ ─ ─ ─ ─ ─ ─ ─ ─ ─ ─ ─   241a
19      "Sid"= "RestrictAccess",
20      "Principal- = "*",
21      "Action"= "s3:*",
22      "Effect" = -Deny",
23      "Resource": [
24          "arn:aws:s3;=:my-bucket",
25          "arn:aws:s3;=:my-bucket/*",
26      ],
27      "Condition"= {
28          "StringNotLike: = {
29              "aws: PrincipalArm" = [
30  ─ ─ ─ ─ ─ ─ ─ ─ ─ ─ ─ ─ ─ ─ ─ ─ ─ ─   242a
31          "arn:aws:iam::2222222222222:role/Cross-
            Account-Role",
32          "arn:aws:iam::111111111111:role/Internal-
            Service-Role"
33          ]
34      }
35      },
36      {
37      "Effect" = -Allow",
38      "Action"= [
39  
```

232

```
1   "version"= "2012-10-17",
2   "statement"= [
3       {
4   ─ ─ ─ ─ ─ ─ ─ ─ ─ ─ ─ ─ ─ ─ ─ ─ ─ ─   240b
5       "Sid" = "OrgRestriction",
6       "Effect"= Deny,
7       "Action"= -s3:*",
8       "Principal" = "*",
9       "Resource"= [
10          "arn:aws:s3;=:my-bucket",
11          "arn:aws:s3;=:my-bucket/*"
12      ],
13      "Condition"= {
14          "StringNotEquals-: {
15              "aws: PrincipalOrgID= "0-abc1234567
16          }
17      }
18  ─ ─ ─ ─ ─ ─ ─ ─ ─ ─ ─ ─ ─ ─ ─ ─ ─ ─   241b
19      "Sid"= "RestrictAccess",
20      "Effect"= -Deny",
21      "Action"= "s3:*",
22      "Principal:- ",
23      "Resource: [
24          "arn:aws:s3;=:my-bucket",
25          "arn:aws:s3;=:my-bucket/*",
26      ],
27      "Condition"= {
28          "StringNotLike: = {
29              "aws: PrincipalArm= [
30  ─ ─ ─ ─ ─ ─ ─ ─ ─ ─ ─ ─ ─ ─ ─ ─ ─ ─   242b
31          "arn:aws:iam::2222222222222:role/Cross-
            Account-Role"
32          "arn:aws:iam::111111111111:role/Internal-
            Service-Role",
33      ]
34      }
35      },
36      {
37      "Sid"= "CrossAccountWriteAccess",
38      "Effect" -Allow",
39  
```

FIG. 2B

DETERMINING CONFIGURATION CHANGES IN A CLOUD COMPUTING ENVIRONMENT

CROSS-REFERENCE TO RELATED APPLICATIONS AND INCORPORATION BY REFERENCE

This is a Continuation application of U.S. application Ser. No. 17/699,832, filed on Mar. 21, 2022, which is incorporated by reference in its entirety

BACKGROUND

Cloud computing may be the on-demand availability (e.g., via the Internet, etc.) of computer system resources (e.g., data centers, servers, edge devices, etc.), such as data storage and computing power, without direct active management by the user. Cloud computing environments (e.g., Amazon Web Services® (AWS), Google Cloud Platform®, etc.) may provide computing services for storing, processing, and managing data over a networked environment including servers, data storage repositories, computing services, communication platforms, virtual development environments, software, and/or the like. The cloud computing environment may further include cloud computing accounts that utilize one or more cloud-computing resources (e.g., storage mediums and/or databases, computational processors, network components, analytic tools, artificial intelligence, services, software applications, etc.) according to resource policies (e.g., a policy document, etc.) that define which cloud computing resources a cloud computing account is authorized/permitted.

Traditionally, information detailing resource policy changes for a cloud computing account, such as version history information and/or the like, is not stored and/or available to be reviewed by any entity other than the cloud computing account it is associated with. Further, information detailing resource policy changes for a cloud computing account is traditionally formatted specific to and/or based on the cloud computing account and there is no guarantee that the format will be persisted and/or is consistent between versions/changes and/or updates. As such, an organization, business, and/or operating entity managing a plurality of cloud computing accounts is unable to determine, review, and/or manage resource policy changes affecting the plurality of cloud computing accounts.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

FIG. 2A shows example configuration information for cloud computing accounts, in accordance with aspects of this disclosure.

FIG. 2B shows example configuration information for cloud computing accounts that has been converted to a common format, in accordance with aspects of this disclosure.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1:
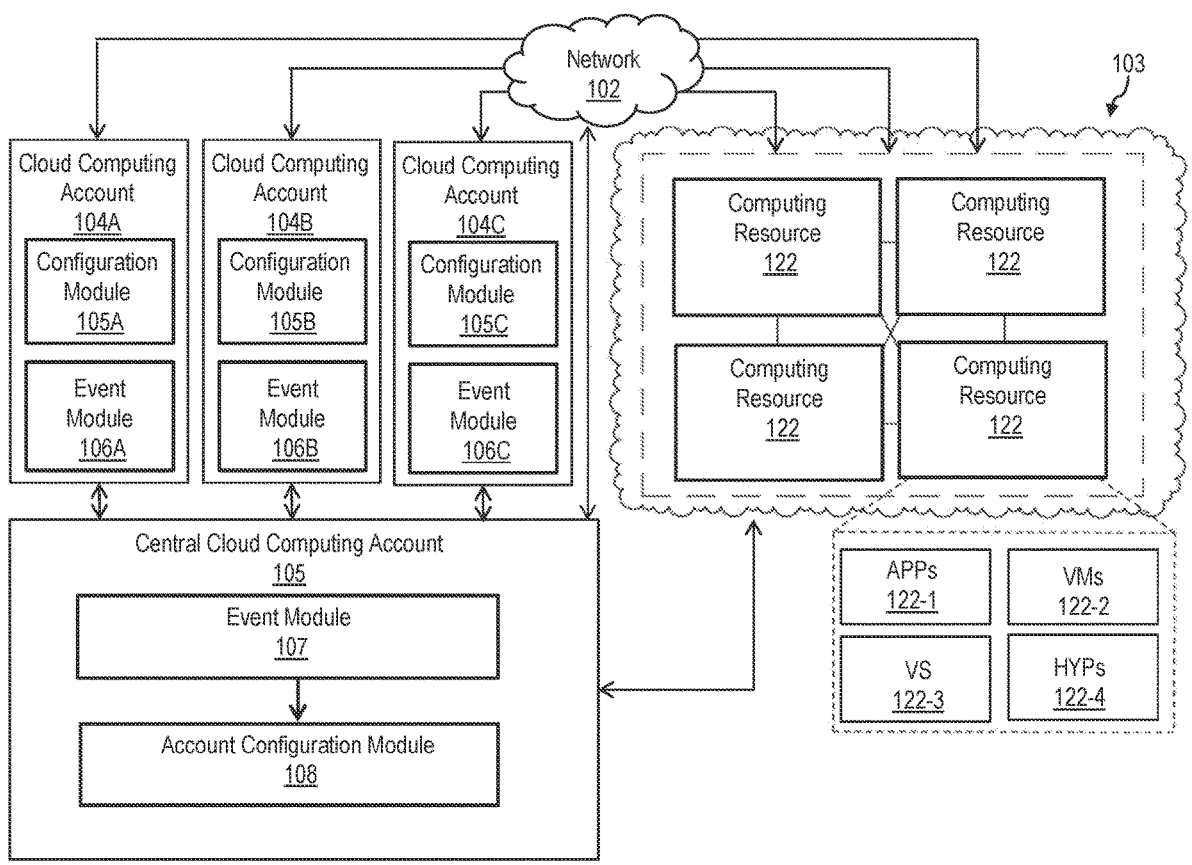
FIG. 1 is a block diagram of an example system for determining configuration changes in a cloud computing environment, in accordance with aspects of this disclosure.

A cloud computing environment may include multiple cloud computing resources (e.g., storage mediums and/or databases, computational processors, network components, analytic tools, artificial intelligence, services, software applications, etc.). The cloud computing environment may further include multiple cloud computing accounts, for example, distributed across various geographic regions, which utilize one or more cloud computing resources. The cloud computing resources a cloud computing account is permitted/authorized to utilize and/or access may be defined according to a resource policy (e.g., a policy document, etc.). The resource policy for a cloud computing account may be evaluated each time the cloud computing account requests access/use of a cloud-computing resource to ensure that the cloud computing account only accesses/uses cloud computing resources for which they are authorized and/or permission has been granted. Conventionally, information detailing resource policy changes for a cloud computing account, such as version history information and/or the like, is not stored and/or available to be reviewed by any entity other than the cloud computing account associated with it. Further, information detailing resource policy changes for a cloud computing account is conventionally formatted specific to and/or based on the cloud computing account. For example, data/information detailing resource policy changes for a cloud computing account may be formatted as a plurality of arrays that are ordered/arranged specific to and/or based on the cloud computing account. For a cloud computing account, there is no guarantee that an order/arrangement of arrays indicative of resource policy data/information will be persisted and/or is consistent between changes and/or versions. As such, an organization, business, and/or operating entity managing a plurality of cloud computing accounts, such as a plurality of cloud computing accounts distributed across various geographic regions and/or the like, is unable to determine and/or review resource policy changes affecting the plurality of cloud computing accounts.

Described herein are methods and systems for determining configuration changes in a cloud computing environment. A central cloud computing account may receive, from each cloud computing account of a plurality of non-centralized cloud computing accounts, an indication of a first event that includes configuration information in a first format for a cloud computing resource associated with the cloud computing account. For example, the configuration information for a non-centralized cloud computing account may indicate and/or include resource policy information associated with the non-centralized cloud computing account. The central cloud computing account may determine the configuration information for each non-centralized cloud computing account, for example, based on the indication of each first event. According to some aspects of this disclosure, the configuration information for each non-centralized cloud computing account may be in a format associated with the non-centralized cloud computing account. The central cloud computing account may transform the configuration information for each non-centralized cloud computing account to a common format. According to some aspects of this disclosure, the central cloud computing account may receive, for each non-centralized cloud computing account of the plurality of non-centralized cloud computing accounts, an update to at least a portion of the configuration information associated with the non-centralized cloud computing account in the format associated with the non-centralized cloud computing account. The central cloud computing account may transform the update to the configuration information for each non-centralized cloud computing account to the common format to enable any changes caused by the update to the configuration information to be reviewed/output, for example, in the common and/or the like.

FIG. 1 is a block diagram of an example system 100 for determining configuration changes in a cloud computing environment, according to some aspects of this disclosure. System 100 may include a cloud computing environment 103, cloud computing accounts 104A-104C, and a central cloud computing account 105, each in communication with and/or connected to a network 102.

According to some aspects of this disclosure, the network 102 may support wired connections, wireless connections, and/or combinations thereof. According to some aspects of this disclosure, one or more portions of the network 102 may be and/or include an ad hoc network, an intranet, an extranet, a virtual private network (VPN), a local area network (LAN), a wireless LAN (WLAN), a wide area network (WAN), a wireless wide area network (WWAN), a metropolitan area network (MAN), the Internet, a Public Switched Telephone Network (PSTN), a cellular telephone network, a wireless network, a WiFi network, a WiMax network, combinations thereof, and/or the like. According to some aspects of this disclosure, the network 102 may include and/or support any type of network.

According to some aspects of this disclosure, the cloud computing environment 103 may include one or more servers, computing devices, and/or the like (not shown) configured to provide/facilitate computing as a service, whereby shared resources, services, and/or the like may be provided to the cloud computing accounts 104A-104C. The cloud computing environment 103 may provide/facilitate computation, software, data access, storage, and/or other services that do not require end-user knowledge of a physical location and configuration of a system and/or a device that delivers the services. For example, the cloud computing environment 103 may include computing resources 122. According to some aspects of this disclosure, the cloud computing environment 103 may be hosted and/or provided by a provider, for example, such as Amazon Web Services® (AWS), Google Cloud Platform®, Microsoft® Azure, IBM® Cloud, and/or the like.

According to some aspects of this disclosure, each of the cloud computing resource(s) 122 may include one or more personal computers, workstations, computing devices, server devices, and/or any other types of computation and/or communication devices. The cloud computing resource(s) 122 may include, for example, storage resources (e.g., Amazon S3®, Storage Area Network (SAN), Network File System (NFS), etc.), network resources (e.g., firewall, load-balancer, and proxy server), internal private resources, external private resources, secure public resources, infrastructure-as-a-service (IaaS), platform-as-a-service (PaaS), software-as-a-service (SaaS), and/or the like.

According to some aspects of this disclosure, the cloud computing resource(s) 122 may include a group of cloud resources, such as one or more applications ("APPs") 122-1, one or more virtual machines ("VMs") 122-2, virtualized storage ("VS") 122-3, and one or more hypervisors ("HYPs") 122-4. The cloud computing resource(s) 122 may communicate with other cloud computing resource(s) 122 via wired connections, wireless connections, or a combination of wired or wireless connections.

According to some aspects of this disclosure, the application 122-1 may include one or more software applications that may be provided to or accessed by a user device (e.g., a computing device, a mobile device, a smart device, a communication device, etc.) in communication with and/or connected to one or more of the cloud computing accounts 104A-104C (not shown). According to some aspects of this disclosure, the application 122-1 may execute locally on a user device. Alternatively, the application 122-1 may eliminate a need to install and execute software applications on a user device. The application 122-1 may include software associated with the cloud computing environment 103 and/or any other software configured to be provided across the cloud computing environment 103. The application 122-1 may send and/or receive information from one or more other applications 122-1, via the virtual machine 122-2.

According to some aspects of this disclosure, the virtual machine 122-2 may include a software implementation of a machine (e.g., a computer) that executes programs like a physical machine. The virtual machine 122-2 may be either a system virtual machine or a process virtual machine, depending upon the use and degree of correspondence to any real machine by the virtual machine 122-2. A system virtual machine may provide a complete system platform that supports the execution of a complete operating system (OS). A process virtual machine may execute a single program and may support a single process. The virtual machine 122-2 may execute on behalf of a user and/or user device and/or on behalf of one or more backend platforms of the cloud computing environment 103 and may manage the infrastructure of the cloud computing environment 103, such as data management, synchronization, and/or long-duration data transfers.

According to some aspects of this disclosure, the virtualized storage 122-3 may include one or more storage systems and/or one or more devices that use virtualization techniques within the storage systems or devices of the cloud computing resource(s) 122. With respect to a storage system, types of virtualizations may include block virtualization and file virtualization. Block virtualization may refer to the abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file-level and the location where files are physically stored. This may enable optimization of storage use, server consolidation, and/or performance of non-disruptive file migrations.

According to some aspects of this disclosure, the hypervisor 122-4 may provide hardware virtualization techniques that allow multiple operations systems (e.g., "guest operating systems") to execute concurrently on a host computer, such as the cloud computing resource(s) 122. The hypervisor 122-4 may present a virtual operating platform to the guest operating systems, may manage the execution of the guest operating systems' multiple instances of a variety of operating systems, and may share virtualized hardware resources.

According to some aspects of this disclosure, the system 100 may include multiple different cloud computing accounts 104A-104C (e.g., cloud-based accounts, cloud hosting accounts, cloud datacenter accounts, Software as a Service accounts (SaaS), Platform as a Service (PaaS) accounts, Infrastructure as a Service (IaaS) accounts, etc.) supported by the cloud computing environment 103. Although only the cloud computing accounts 104A-104C are shown, the system may include any number of cloud computing accounts. The cloud computing accounts (e.g., the computing accounts 104A-104C, etc.) may be associated with an organization, business, and/or operating entity and/or the like, and may be distributed across various geographic regions. For example, the computing accounts 104A-104C may be non-centralized cloud computing accounts distributed across various geographic regions and managed, provided, and/or associated with an organization, business, and/or operating entity and/or the like. The cloud computing accounts 104A-104C may utilize the cloud computing resources 122.

According to some aspects of this disclosure, the cloud computing accounts 104A-104C may each include a configuration module. For example, the cloud computing accounts 104A-104C may include configuration modules 105A-105C, respectively. A configuration module may include and/or store configuration information, policy information, and/or the like describing which cloud computing resources 122 a cloud computing account (e.g., the computing accounts 104A-104C, etc.) is authorized and/or permitted to access. A configuration module (e.g., the configuration modules 105A-105C, etc.) may manage and/or control which users of a cloud computing account are authenticated (e.g., signed in, etc.) and authorized (e.g., has permissions, etc.) to use the cloud computing resources 122. For example, a configuration module (e.g., the configuration modules 105A-105C, etc.) may include one or more identity and access management (IAM) tools and/or services configured to verify account user identities before enabling access to the cloud computing resources 122 and/or ensure that access to the cloud computing resources 122 is being granted according to appropriate access policies for onboarding and role/responsibility changes. According to some aspects of this disclosure, a user interface (not shown) may be used to create and edit end-user-managed policies. The user interface may be used to display a summary of permissions that are granted by a configuration, a policy, and/or the like stored by the configuration module (e.g., the configuration modules 105A-105C, etc.).

According to some aspects of this disclosure, a configuration module (e.g., the configuration modules 105A-105C, etc.) may store configuration (e.g., resource-based policies, etc.) information, policy (e.g., identity-based policies, etc.) information, and/or the like as JavaScript Object Notation (JSON) documents and/or the like. A configuration module (e.g., the configuration modules 105A-105C, etc.) may store configuration information, policy information, and/or the like in a format associated with a respective cloud computing account (e.g., the computing accounts 104A-104C, etc.). For example, the configuration modules 105A-105C may each store an AWS resource policy document and/or like associated with the respective cloud computing accounts 104A-104C. According to some aspects of this disclosure, the configuration information may be formatted as a plurality of arrays that are ordered/arranged according to and/or based on the respective cloud computing account (e.g., the computing accounts 104A-104C, etc.).

FIG. 2A shows example configuration information for different non-centralized cloud computing accounts. The configuration information 200 may be, for example, a resource policy document for the cloud computing account 104A, and the configuration information 204 may be a resource policy document for the cloud computing account 104B. The configuration information 200 and the configuration information 204 may both enable similar access to computing resources (e.g., the computing resource 122, etc.). As shown, the information and/or fields included with the configuration information for different cloud computing accounts may be ordered and/or arranged differently. For example, the configuration information 200 may first indicate an "effect" of the resource policy document at 201, then an "action" implemented by the resource policy document at 202, followed by a "resource" to which the resource policy document is applied at 203. The configuration information 204 may first indicate a "resource" to which the resource policy document is applied a 205, an "action" implemented by the resource policy document at 206, and indicate an "effect" of the resource policy document at 207. The configuration information 200 may include at 203 an array that includes data ordered with an indication of a computing resource (e.g., the cloud computing resource 122) presented first, and the configuration information 204 may include at 305 an array that includes data ordered with an indication of a computing resource (e.g., the cloud computing resource 122) presented second. This is because there is no guarantee that an order/arrangement of arrays indicative of resource policy data/information will be consistent between different cloud computing accounts. Configuration information may be formatted as arrays that are ordered/arranged according to and/or based on the respective cloud computing account.

Returning to FIG. 1, according to some aspects of this disclosure, the cloud computing accounts 104A-104C may each include an event module. For example, the cloud computing accounts 104A-104C may include event modules 106A-106C, respectively. According to some aspects of this disclosure, the event modules 106A-106C may include respective pipelines, event buses (e.g., an EventBridge default bus, etc.), and/or the like that receive events. An event may be and/or indicate a change affecting a cloud computing account, for example, such as a change to configuration information, policy information, and/or the like. According to some aspects of this disclosure, the event modules 106A-106C may include and/or receive events from public cloud storage resources, for example, such as Amazon® Simple Storage Service (S3) buckets, and/or any other object storage mediums. For example, the event modules 106A-106C may include one or more file folders, that store objects (e.g., discrete units of data, etc.), which consist of data and its descriptive metadata. According to some aspects of this disclosure, data and/or descriptive metadata stored by the event modules 106A-106C may indicate changes to configuration information, policy information, and/or the like. For example, according to some aspects of this disclosure, an event may be generated and/or output whenever a data element associated with a respective computing account 104A-104C is created in at least one of the computing resources 122, whenever a data element associated with a respective computing account 104A-104C is removed in at least one of the computing resources 122, whenever a data element associated with a respective computing account 104A-104C cloud computing account is restored in at least one of the computing resources 122, and/or the like. According to some aspects of this disclosure, the event modules 106A-106C may be configured to generate and/or output events according to any criteria.

The event modules 106A-106C may include information, for example, such as one or more rules and/or the like, that specify which events to allow, and which users and/or entities of the respective cloud computing accounts 104A-104C have permission to create or modify rules and/or triggers for an event. For example, the event modules 106A-106C may implement a policy on an event bus to allow or deny events from sources. For example, the event modules 106A-106C may include information and/or rules that enable the event modules 106A-106C to receive Event-Bridge Rule S3 bucket events and/or the like from respective configuration modules 105A-105C.

According to some aspects of this disclosure, the central cloud computing account 105 may aggregate events from the computing accounts 104A-104C. For example, the central cloud computing account 105 may facilitate centralized aggregation of events (e.g., configuration change events, policy change events, computing resource-based events, AWS resource policy modification events, etc.) across multiple cloud computing accounts (e.g., the cloud computing accounts 104A-104C, AWS accounts, etc.) and geographic regions. According to some aspects of this disclosure, the central cloud computing account 105 may standardize formatting for configuration information (e.g., computing resource policy information, AWS resource policy information, etc.) indicated by an event. According to some aspects of this disclosure, the central cloud computing account 105 may provide versioning for configuration information (e.g., computing resource policy information, AWS resource policy document, etc.) associated with non-centralized cloud computing accounts implemented in various geographic regions, for example, such as the cloud computing accounts 104A-104C.

For example, according to some aspects of this disclosure, the central cloud computing account 105 may include an event module 107. The event module 107 may include a pipeline, a central event bus (e.g., an EventBridge default bus, etc.), and/or the like configured to receive events and/or indications of events from the cloud computing accounts 104A-104C. According to some aspects of this disclosure, the event module 107 may receive indications of events from the cloud computing accounts 104A-104C that include and/or indicate configuration information, such as AWS resource policy documents and/or the like. For example, according to some aspects of this disclosure, the event module 107 may receive an indication of all AWS resource policy change events associated with the cloud computing accounts 104A-104C.

As described, according to some aspects of this disclosure, the event module 107 may receive configuration information from each of the cloud computing accounts 104A-104C in formats associated with the respective cloud computing accounts 104A-104C. The event module 107 may forward the events to account configuration module 108. For example, according to some aspects of this disclosure, the account configuration module 108 may include a message queuing service configured to receive events from the cloud computing accounts 104A-104C and/or the like.

According to some aspects of this disclosure, the central cloud computing account 105 may transform configuration information, such as AWS resource policy documents and/or the like, received from the cloud computing accounts 104A-104C to a common format. According to some aspects of this disclosure, the account configuration module 108 may forward events from the message queuing service to compute service, such as an AWS Lamda function and/or the like, that transforms configuration information, such as AWS resource policy documents and/or the like, received from the cloud computing accounts 104A-104C to a common format.

For example, a compute service of the account configuration module 108 may run each received resource policy document through a custom formatting algorithm and/or routine. For example, for each resource policy document and/or any other configuration information received from a non-centralized cloud computing account (e.g., the cloud computing accounts 104A-104C, etc.), the account configuration module 108 may: sort arrays of strings alphabetically; remove duplicate items in array strings; reorder the keys in each policy statement to follow a standard order (e.g., a user-defined order, a customizable standard order, etc.); and place certain statements (e.g., determined by a statement identifier, etc.) at the top of the policy in a standard order. According to some aspects of this disclosure, the account configuration module 108 may standardize policy documents and/or the like from non-centralized cloud computing accounts into a consistent format with no functional changes to the policy by: sorting the top-level policy document keys by a predefined order; sorting the statement level keys by a predefined order; rearranging the statement objects within the "Statement" array by inspecting a "Sid" value and/or the like and organizing them by a predefined Sid order; sorting and deduplicating all arrays in the policy document. The account configuration module 108 may convert arrays that contain a single string item into a string. According to some aspects of this disclosure, the account configuration module 108 may implement any custom formatting algorithm and/or routine. As described, the changes made to a resource policy document and/or the like by a custom formatting algorithm and/or routine have no functional impact on the interpretation of the policy indicated by the resource policy document and/or the like by the cloud computing environment 103 and/or any other component of the system 100.

According to some aspects of this disclosure, the account configuration module 108 may cause configuration information received from non-centralized cloud computing accounts (e.g., the cloud computing accounts 104A-104C, etc.) that has been transformed to a common format to be persisted by a source control (e.g., version control, etc.) service and/or repository. According to some aspects of this disclosure, configuration information received from non-centralized cloud computing accounts (e.g., the cloud computing accounts 104A-104C, etc.) that has been transformed to a common format and persisted by a source control (e.g., version control, etc.) service and/or repository may be persisted using a standard folder structure so that it may be versioned. The common format of the versioned configuration information enables visual identification of any changes associated with a non-centralized cloud computing account (e.g., the cloud computing accounts 104A-104C, etc.). For example, according to some aspects of this disclosure, executing a diff function of source control enables two versions of an AWS resource policy document to be compared such that changes between the documents may be visualized.

FIG. 2B shows an example of original configuration information 230 and converted configuration information 232. The converted configuration information 232 is represented in a common format. Example changes between configuration information 230 and converted configuration information 232 are indicated by sections 240-242, with sections 240a, 241a, and 242a belonging to original configuration information 230 and corresponding sections 240a, 241a, and 242a belonging to converted configuration information 232, respectively. Section 240a of original configuration information 230 shows designations for resource policy element "Action" is indicated before resource policy element "Effect." The same designations for resource policy elements "Action" and "Effect" are shown in section 240b of converted configuration information 232, however, the order has been converted to a common format that lists designations for the resource policy element "Action" after the resource policy element "Effect." Similarly, section 241a of original configuration information 230 shows an order for resource policy elements "Principal," "Action," and "Effect" that has been reordered according to the common format in section 241b of converted configuration information 232. Section 242a of original configuration information 230 shows resource policy elements "Service-Role" and "Action-Role" that have been reordered according to the common format in section 242b of converted configuration information 232 such that "Action-Role" is designated before "Service-Role." There is no functional change between these original configuration information 230 and converted configuration information 232. The common format of the versioned converted configuration information 232 enables visual identification of any changes associated with the original configuration information 230 and additional configuration information provided by a non-centralized cloud computing account. It will be appreciated that original configuration information for a non-centralized cloud computing account may be in any format, arrangement, and/or order, and still be converted to the common format, for example, by the account configuration module 108.

Figure 3:
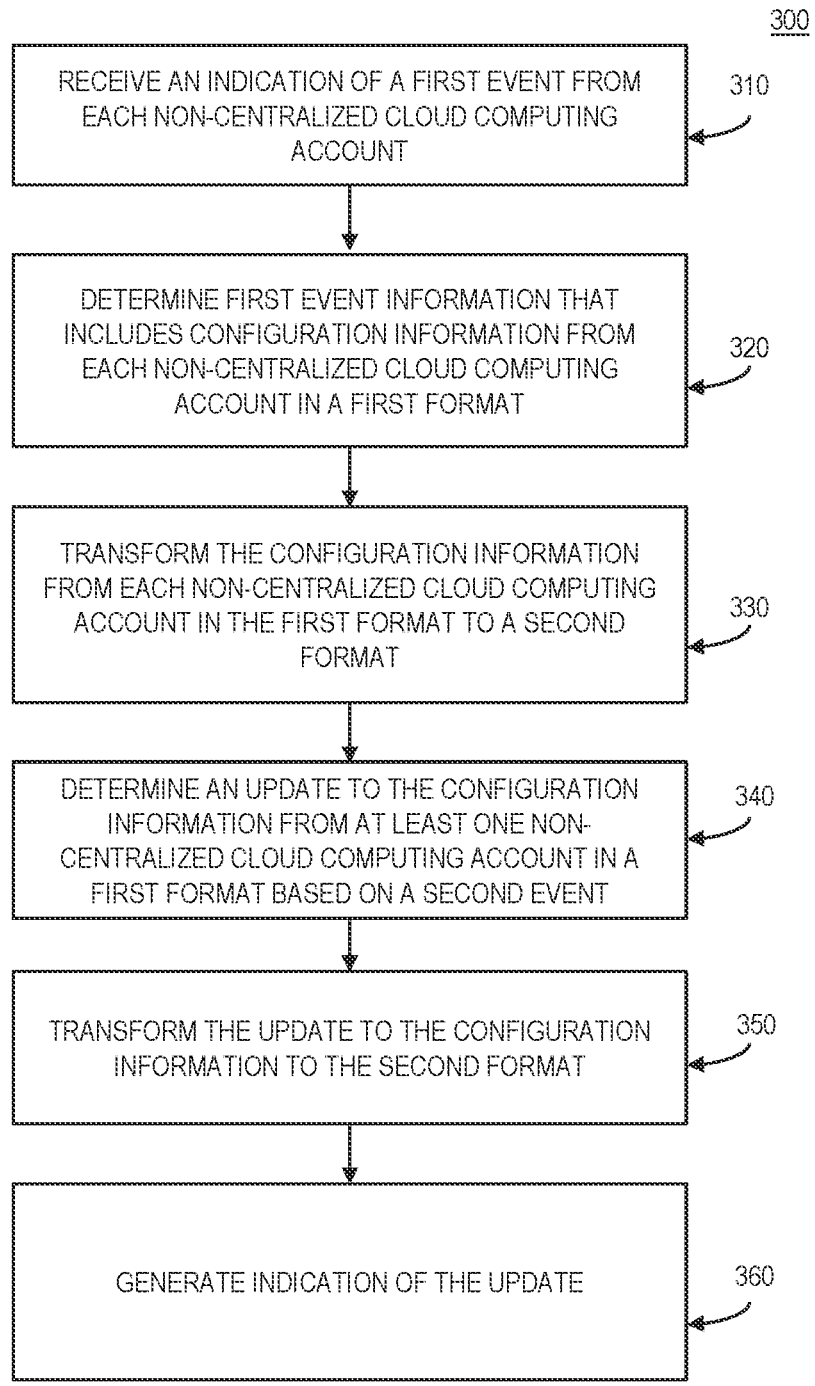
FIG. 3 illustrates an example method for determining configuration changes in a cloud computing environment, in accordance with aspects of this disclosure.

FIG. 3 illustrates an example computer-implemented method 300 for determining configuration changes in a cloud computing environment, according to some aspects of this disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 3, as will be understood by a person of ordinary skill in the art. Method 300 shall be described with regard to elements of FIG. 1 and can be performed by the central cloud computing account 105 of FIG. 1 and/or computer system 300 of FIG. 3. However, method 300 is not limited to the specific aspects depicted in those figures and other systems can be used to perform the method as will be understood by those skilled in the art.

In 310, the central cloud computing account 105 may receive, from each non-centralized cloud computing account of a plurality of non-centralized cloud computing accounts, an indication of a respective first event. Each respective first event received from each of the non-centralized cloud computing accounts may include respective configuration information in a respective first format (e.g., configuration information 200, the configuration information 204, etc.) for a cloud computing resource associated with a respective cloud computing account. According to some aspects of this disclosure, a first non-centralized cloud computing account of the plurality of non-centralized cloud computing accounts may be associated with a first geographical region and a second non-centralized cloud computing account of the plurality of non-centralized cloud computing accounts may be associated with a second geographical region. According to some aspects of this disclosure, for each non-centralized cloud computing account of the plurality of cloud computing accounts, the respective configuration information in the respective first format may include an order for at least one of: arrays, policy statement keys, or data elements.

According to some aspects of this disclosure, for each non-centralized cloud computing account of the plurality of non-centralized cloud computing accounts the respective first event may be based on at least one of: creation of a data element in a storage medium associated with the non-centralized cloud computing account, removal of a data element associated with the non-centralized cloud computing account, restoration of a data element associated with the non-centralized cloud computing account, or a change in a configuration associated with the non-centralized cloud computing account. For example, a first event may be triggered by implementation and/or a change to an AWS resource policy document and/or the like.

In 320, the central cloud computing account 105 may determine first event information. The central cloud computing account 105 may determine the first event information based on the indication of each respective first event received from each non-centralized cloud computing account of the plurality of non-centralized cloud computing accounts. The first event information may include, for each non-centralized cloud computing account of the plurality of non-centralized cloud computing accounts, the respective configuration information in the respective first format associated with the non-centralized cloud computing account. According to some aspects of this disclosure, first event information may include identity-based policy information for at least one non-centralized cloud computing account of the plurality of non-centralized cloud computing accounts.

In 330, the central cloud computing account 105 may transform, for each non-centralized cloud computing account of the plurality of non-centralized cloud computing accounts, the respective configuration information in the respective first format into a second format. For example, the central cloud computing account 105 may transform the respective configuration information in the respective first format into a second format based on format instructions received via a graphical user interface (GUI) associated with the central cloud computing account and the first event information. According to some aspects of this disclosure, the second format may be a customizable common format implemented by the central cloud computing account 105.

In 340, the central cloud computing account 105 may determine second event information. For example, the central cloud computing account 105 may determine second event information based on an indication of a respective second event received from each non-centralized cloud computing account of the plurality of non-centralized cloud computing accounts. According to some aspects of this disclosure, for each non-centralized cloud computing account of the plurality of non-centralized cloud computing accounts the respective second event may be based on at least one of: creation of a data element in a storage medium associated with the non-centralized cloud computing account, removal of a data element associated with the non-centralized cloud computing account, restoration of a data element associated with the non-centralized cloud computing account, or a change in a configuration associated with the non-centralized cloud computing account. For example, a second event may be triggered by a change to an AWS resource policy document and/or the like.

According to some aspects of this disclosure, the second event information may include, for each non-centralized cloud computing account of the plurality of non-centralized cloud computing accounts, an update to at least a portion of the respective configuration information in the respective first format associated with the non-centralized cloud computing account. According to some aspects of this disclosure, the second event information may include an update to identity-based policy information for at least one non-centralized cloud computing account.

In 350, the central cloud computing account 105 may transform, for each non-centralized cloud computing account of the plurality of non-centralized cloud computing accounts, the update to at least the portion of the respective configuration information in the respective first format into the second format. For example, the central cloud computing account 105 may transform the update to at least the portion of the respective configuration information in the respective first format into the second format based on the format instructions and the second event information. According to some aspects of this disclosure, transforming the configuration information in the respective first format associated with the non-centralized cloud computing account to be in a second format includes sending the format instructions and the first event information to a distributed message queuing service configured to determine the second format based on the format instructions.

In 360, the central cloud computing account 105 may generate, for at least one non-centralized computing account of the plurality of non-centralized cloud computing accounts, the update to at least the portion of the respective configuration information. For example, the central cloud computing account 105 may generate the update to at least the portion of the respective configuration information based on the second format, the first event information, and the second event information. According to some aspects of this disclosure, the update to at least the portion of the respective configuration information may be displayed and/or visualized, for example, via a user interface, GUI, and/or the like.

Figure 4:
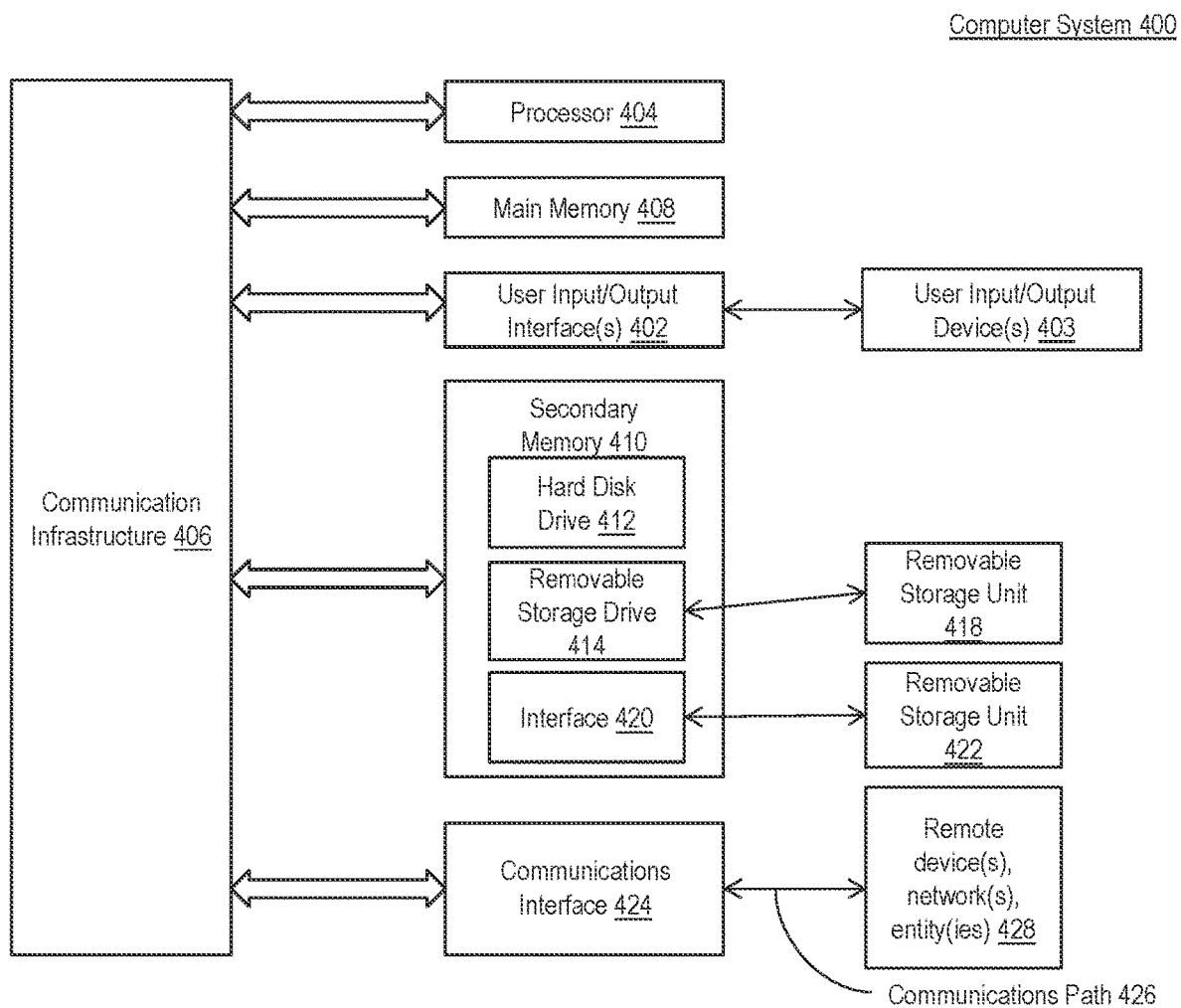
FIG. 4 is an example computer system useful for implementing various aspects disclosed herein.

Various aspects of this disclosure can be implemented, for example, using one or more computer systems, such as computer system 400 shown in FIG. 4. Computer system 400 can be used, for example, to implement any method (e.g., the method 300, etc.) described herein. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure 406 (a bus, etc.).

One or more processors 404 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (e.g., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 includes a computer usable or readable storage device having stored thereon computer software (control logic) and/or data. Removable storage unit 418 can be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 can include other means, instrumentalities or other approaches for allowing computer programs and/or other instructions and/or data to be accessed by computer system 400. Such means, instrumentalities, or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer-implemented method for determining configuration changes in a cloud computing environment, the method comprising:
receiving, by a central cloud computing account, an indication of first configuration information for a first non-centralized cloud computing account associated with a first geographical region and second configuration information for a second non-centralized cloud computing account associated with a second geographical region,
wherein the first configuration information is in a first format for a first cloud computing resource associated with the first non-centralized cloud computing account and the second configuration information is in a second format for a second cloud computing resource associated with the second non-centralized cloud computing account;
transforming, for the first non-centralized cloud computing account and the second non-centralized cloud computing account, based on a reorder of policy statement keys for a respective policy statement and preset order for statements of the respective policy statement determined by respective statement identifiers, the first configuration information and the second configuration information into a common format;
transforming, based on format instructions, an update for at least a portion of the first configuration information in the first format and an update for at least a portion of the second configuration information in the second format into the common format; and
causing display of the update for at least the portion of the first configuration information in the common format or the update for at least the portion of the second configuration information in the common format.

2. The method of claim 1, wherein at least one of the receiving the first configuration information or the second configuration information is based on at least one of: creation of a data element in a storage medium associated with at least one of the first non-centralized cloud computing account or the second non-centralized cloud computing account, removal of a data element associated with at least one of the first non-centralized cloud computing account or the second non-centralized cloud computing account, restoration of a data element associated with at least one of the first non-centralized cloud computing account or the second non-centralized cloud computing account, or a change in a configuration associated with at least one of the first non-centralized cloud computing account or the second non-centralized cloud computing account.

3. The method of claim 1, wherein at least one of the first configuration information or the second configuration information comprises an order for at least one of: arrays, policy statement keys, or data elements.

4. The method of claim 1, wherein the update for at least the portion of the first configuration information in the first format or the update for at least the portion of the second configuration information in the second format comprises an update to identity-based policy information associated with the first non-centralized cloud computing account or the second non-centralized cloud computing account.

5. The method of claim 1, wherein at least one of the at least one of the first non-centralized cloud computing account or the second non-centralized cloud computing account comprises at least one of a cloud hosting account, a cloud datacenter account, a Software as a Service account (SaaS), a Platform as a Service (PaaS) account, or an Infrastructure as a Service (IaaS) account.

6. The method of claim 1, wherein at least one of the first cloud computing resource or the second cloud computing resource comprises at least one of: a storage resource or a network resource.

7. The method of claim 1, wherein the receiving the indication of the first configuration information and the second configuration information is based on events triggered by at least one public cloud storage resource.

8. A non-transitory computer-readable medium having instructions stored thereon that, when executed by at least one computing device, cause the at least one computing device to perform operations comprising:
receiving an indication of first configuration information for a first non-centralized cloud computing account associated with a first geographical region and second configuration information for a second non-centralized cloud computing account associated with a second geographical region,
wherein the first configuration information is in a first format for a first cloud computing resource associated with the first non-centralized cloud computing account and the second configuration information is in a second format for a second cloud computing resource associated with the second non-centralized cloud computing account;

transforming, for the first non-centralized cloud computing account and the second non-centralized cloud computing account, based on a reorder of policy statement keys for a respective policy statement and preset order for statements of the respective policy statement determined by respective statement identifiers, the first configuration information and the second configuration information into a common format;

transforming, based on format instructions, an update for at least a portion of the first configuration information in the first format and an update for at least a portion of the second configuration information in the second format into the common format; and causing display of the update for at least the portion of the first configuration information in the common format or the update for at least the portion of the second configuration information in the common format.

9. The non-transitory computer-readable medium of claim 8, wherein at least one of the receiving the first configuration information or the second configuration information is based on at least one of: creation of a data element in a storage medium associated with at least one of the first non-centralized cloud computing account or the second non-centralized cloud computing account, removal of a data element associated with at least one of the first non-centralized cloud computing account or the second non-centralized cloud computing account, restoration of a data element associated with at least one of the first non-centralized cloud computing account or the second non-centralized cloud computing account, or a change in a configuration associated with at least one of the first non-centralized cloud computing account or the second non-centralized cloud computing account.

10. The non-transitory computer-readable medium of claim 8, wherein at least one of the first configuration information or the second configuration information comprises an order for at least one of: arrays, policy statement keys, or data elements.

11. The non-transitory computer-readable medium of claim 8, wherein the update for at least the portion of the first configuration information in the first format or the update for at least the portion of the second configuration information in the second format comprises an update to identity-based policy information associated with the first non-centralized cloud computing account or the second non-centralized cloud computing account.

12. The non-transitory computer-readable medium of claim 8, wherein at least one of the at least one of the first non-centralized cloud computing account or the second non-centralized cloud computing account comprises at least one of a cloud hosting account, a cloud datacenter account, a Software as a Service account (SaaS), a Platform as a Service (PaaS) account, or an Infrastructure as a Service (IaaS) account.

13. The non-transitory computer-readable medium of claim 8, wherein at least one of the first cloud computing resource or the second cloud computing resource comprises at least one of: a storage resource or a network resource.

14. The non-transitory computer-readable medium of claim 8, wherein the receiving the indication of the first configuration information and the second configuration information is based on events triggered by at least one public cloud storage resource.

15. A system comprising:
a memory; and
at least one processor coupled to the memory and configured to perform operations comprising:
receiving an indication of first configuration information for a first non-centralized cloud computing account associated with a first geographical region and second configuration information for a second non-centralized cloud computing account associated with a second geographical region,
wherein the first configuration information is in a first format for a first cloud computing resource associated with the first non-centralized cloud computing account and the second configuration information is in a second format for a second cloud computing resource associated with the second non-centralized cloud computing account;

transforming, for the first non-centralized cloud computing account and the second non-centralized cloud computing account, based on a reorder of policy statement keys for a respective policy statement and preset order for statements of the respective policy statement determined by respective statement identifiers, the first configuration information and the second configuration information into a common format;

transforming, based on format instructions, an update for at least a portion of the first configuration information in the first format and an update for at least a portion of the second configuration information in the second format into the common format; and causing display of the update for at least the portion of the first configuration information in the common format or the update for at least the portion of the second configuration information in the common format.

16. The system of claim 15, wherein at least one of the receiving the first configuration information or the second configuration information is based on at least one of: creation of a data element in a storage medium associated with at least one of the first non-centralized cloud computing account or the second non-centralized cloud computing account, removal of a data element associated with at least one of the first non-centralized cloud computing account or the second non-centralized cloud computing account, restoration of a data element associated with at least one of the first non-centralized cloud computing account or the second non-centralized cloud computing account, or a change in a configuration associated with at least one of the first non-centralized cloud computing account or the second non-centralized cloud computing account.

17. The system of claim 15, wherein at least one of the first configuration information or the second configuration information comprises an order for at least one of: arrays, policy statement keys, or data elements.

18. The system of claim 15, wherein the update for at least the portion of the first configuration information in the first format or the update for at least the portion of the second configuration information in the second format comprises an update to identity-based policy information associated with the first non-centralized cloud computing account or the second non-centralized cloud computing account.

19. The system of claim 15, wherein at least one of the at least one of the first non-centralized cloud computing account or the second non-centralized cloud computing account comprises at least one of a cloud hosting account, a cloud datacenter account, a Software as a Service account (SaaS), a Platform as a Service (PaaS) account, or an Infrastructure as a Service (IaaS) account.

20. The system of claim 15, wherein at least one of the first cloud computing resource or the second cloud computing resource comprises at least one of: a storage resource or a network resource.

\* \* \* \* \*